MILLS & BISSELL.
Weighing Scales.

No. 14,198.

Patented Feb. 5, 1856.

UNITED STATES PATENT OFFICE.

S. S. MILLS AND M. BISSELL, OF CHARLESTON, SOUTH CAROLINA.

WEIGHING-SCALE.

Specification of Letters Patent No. 14,198, dated February 5, 1856.

*To all whom it may concern:*

Be it known that we, S. S. MILLS and M. BISSELL, of Charleston, in the district of Charleston and State of South Carolina, have invented a new and useful Improvement in Scales for Weighing; and we do hereby declare that the following is a full, clear, and exact description of the same, reference being had to the annexed drawings, making a part of this specification, in which—

Figure 1:
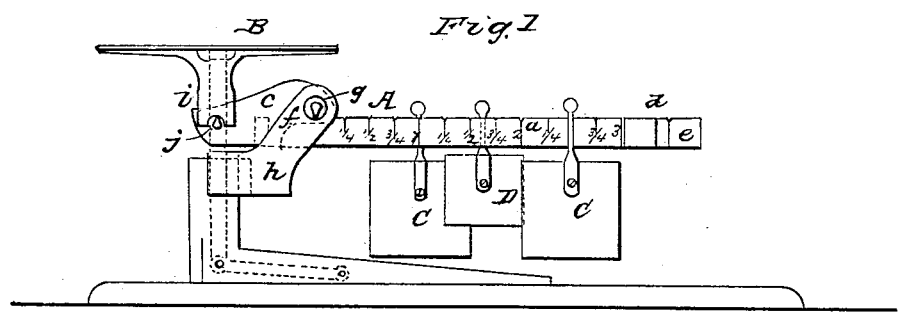
Figure 2:
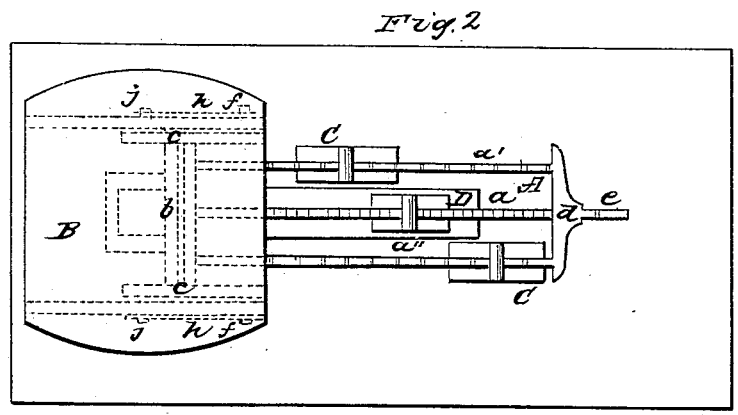

Figure 1, is a side view of our improvement. Fig. 2, is a plan or top view of ditto.

Similar letters of reference indicate corresponding parts in the two figures.

Our invention consists in having the scale beam provided with two or more arms on each of which a weight is fitted and having the scale beam constructed as will be presently shown so that the weights may be placed on the arms in line with the fulcrum when necessary thereby enabling the weights to be permanent fixtures or at all times upon the arms.

To enable those skilled in the art to fully understand and construct our invention, we will proceed to describe it.

A, represents the scale beam which has three arms $(a)$, $(a')$, $(a'')$, the inner ends of the arms being connected with a transverse bar $(b)$, the ends of which are connected to side pieces $(c)$, $(c)$, which are parallel with the arms see dotted lines Fig. 2. The outer ends of the arms are connected by a cross piece $(d)$, which has a short horizontal projection $(e)$, on its outer side. The above parts may be all cast in one piece.

The inner parts of the side pieces $(c)$, $(c)$, have knife edged projections $(f)$, attached to them one to each, and on their outer sides. The knife edged projections $(f)$, are fitted in apertures, $(g)$, $(g)$, made in bars $(h)$, $(h)$, attached to a suitable support or framing.

B, is the disk or basin which has two vertical arms $(i)$, attached to its under surface one at each side. The lower ends of these arms rest upon knife edged projections $(j)$, $(j)$, attached to the outer ends of the side pieces $(c)$, $(c)$.

The arms $(a)$, $(a')$, $(a'')$, of the scale beam A, are graduated into pounds, and fractional parts thereof the center arm $(a)$, may be graduated much smaller than the other two. On each of the outer arms $(a')$ $(a'')$, a weight, C, is placed, the weights having loops or eyes on their upper ends which loops or eyes are fitted on the arms. A weight D, is placed on the center arm $(a)$. This weight may be smaller than the others, the difference corresponding to the difference in the graduation of the arms.

The two weights C, C, are of equal size and consequently if both of said weights are moved out on the arms $(a')$, $(a'')$, double the quantity of material may be weighed than if only one arm and weight of the same size were employed. By having therefore a plurality of arms the scales are rendered portable. Another advantage is that the tare may be weighed with facility by using either of the weights for that purpose. The small weight D, is intended for weighing small fractional parts.

The weights that are not used are placed at the inner ends of the arms in line with the fulcrum, and when there placed, do not of course affect the beam as far as equilibrium is concerned. And the weights therefore may be considered as permanent fixtures and cannot be lost or mislaid.

Having thus described our invention what we claim as new and desire to secure by Letters Patent, is—

Constructing the scale beam A with arms $(a)$ $(a')$ $(a'')$, two or more and otherwise arranged as shown so that either of the weights on the arms may when not in use be placed in line with the fulcrum of the beam substantially as described for the purpose specified.

S. S. MILLS.
M. BISSELL.

Witnesses
S. G. COURTENAY,
C. D. C. ADAMS.